United States Patent [19]

Sakata

[11] Patent Number: 4,811,094
[45] Date of Patent: Mar. 7, 1989

[54] VIDEO SIGNAL PROCESSING DEVICE
[75] Inventor: Tsuguhide Sakata, Tokyo, Japan
[73] Assignee: Canon Kabushiki Kaisha, Tokyo, Japan
[21] Appl. No.: 27,998
[22] Filed: Mar. 17, 1987

Related U.S. Application Data

[63] Continuation of Ser. No. 561,639, Dec. 15, 1983, abandoned.

[30] Foreign Application Priority Data

Dec. 22, 1982 [JP] Japan ................... 57-225630

[51] Int. Cl.$^4$ ........................................... H04N 5/14
[52] U.S. Cl. ........................................ 358/160; 358/141
[58] Field of Search ................ 358/136, 160, 140, 11, 358/21 R, 320, 312, 313, 166, 167, 141, 88; 360/11.1, 10.3, 10.1

[56] References Cited

U.S. PATENT DOCUMENTS

| | | | |
|---|---|---|---|
| 4,027,333 | 5/1977 | Kaiser et al. | 360/11.1 |
| 4,096,514 | 6/1978 | Scholz | 358/11.1 |
| 4,251,830 | 2/1981 | Tatami | 358/320 |
| 4,298,896 | 11/1981 | Heitmann | 360/11.1 |
| 4,335,400 | 6/1982 | Chow et al. | 358/167 |
| 4,400,719 | 8/1983 | Powers | 358/160 |
| 4,412,251 | 10/1983 | Tanaka et al. | 358/160 |
| 4,460,925 | 7/1984 | Devereux | 360/10.1 |
| 4,470,076 | 9/1984 | Arai et al. | 358/312 |

Primary Examiner—James J. Groody
Assistant Examiner—David E. Harvey
Attorney, Agent, or Firm—Robin, Blecker & Daley

[57] ABSTRACT

A video signal processing device in which an input video signal is delayed by a period of time equal to an integer number times one horizontal scanning period to obtain a delayed video signal, the input video signal is output for a predetermined period related to a vertical blanking period of the input signal and a mixed signal which includes the input video signal and the delayed video signal is output for a period other than the predetermined period.

10 Claims, 3 Drawing Sheets

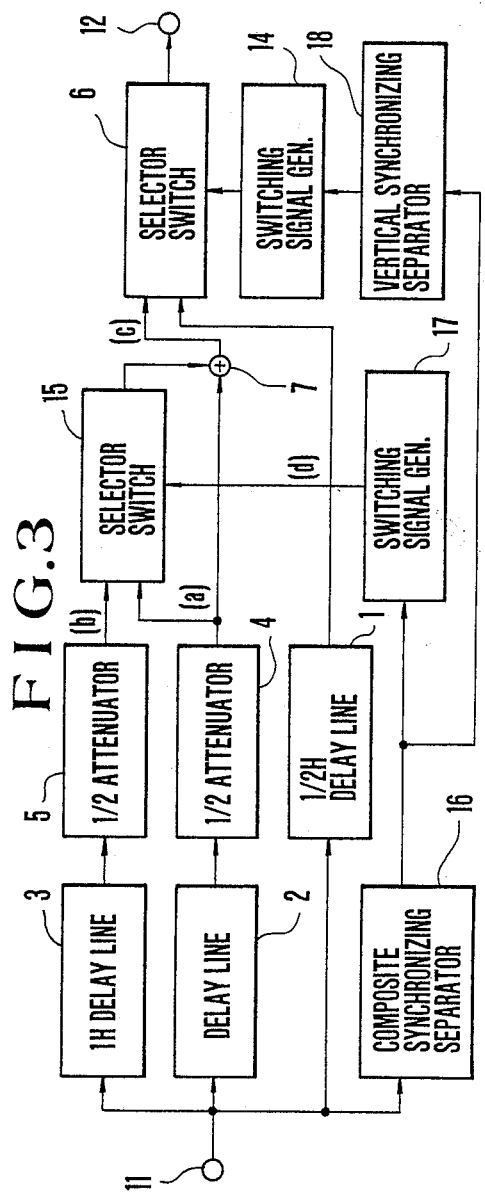
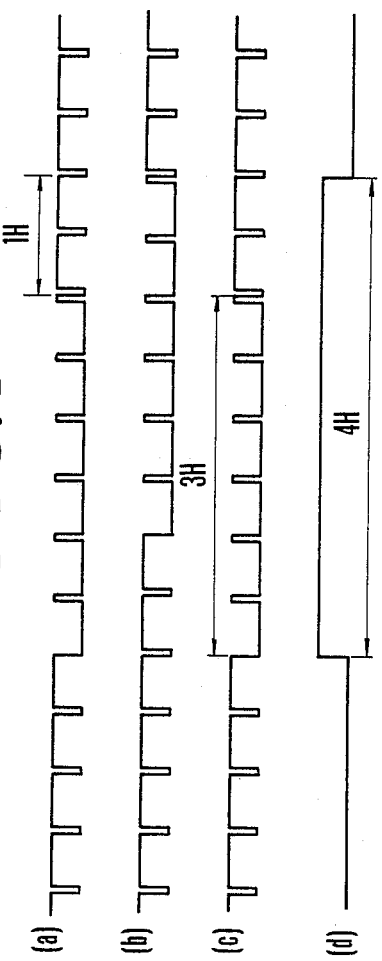

4,811,094

VIDEO SIGNAL PROCESSING DEVICE

This is a continuation of application Ser. No. 561,639, filed Dec. 15, 1983, now abandoned.

BACKGROUND OF THE INVENTION

1. Field of the Invention

This invention relates to video signal processing devices, and, more particularly, to video signal processing devices for processing signals by utilizing the vertical correlativity of video signals.

2. Description of the Prior Art

In the following a system is discussed for forming one frame by two fields taking as an example of an apparatus for obtaining one frame structure of video signals from one field of video signals by using line interpolation, as illustrated in FIG. 1. The main constituent parts of such apparatus comprise a ½H delay line 1 where H designates one horizontal scanning period, in the NTSC system, about 63.556 μsec., a very short time delay line 2 for fine adjustment of the delay time on the order of 100 to several 100 nsec., a 1H delay line 3, two attenuators 4 and 5 for producing an output of amplitude ½ times lower than that of the input signal, a selector switch 6 and an adder 7.

Next, explanation is given to the operation of the apparatus of FIG. 1. As, for example, in the rotating magnetic sheet, one field of video signals was recorded in each round track, and is later continuously reproduced, a successive series of reproduced video signals for one field (hereinafter referred to as one "field signal") is assumed to arrive at an inlet 11 of FIG. 1. This field signal is supplied to a ½H delay line 1 where it is delayed by a time corresponding to the ½H, and of which the output is then applied to selector switch 6. Let us call the video output signal of the ½H delay line 1 ½H signal. From a point of view of one frame of video signals (hereinafter referred to as one "frame signal") which will be finally obtained by the apparatus of FIG. 1, this ½H signal is a signal of, for example, the first field.

Also, the aforesaid field signal is applied to a delay line 2 and a 1H delay line 3 of which the delay times are respectively about 100 to several 100 nsec. and a time corresponding to 1H, and therefrom to respective ½ amplitude attenuators 4 and 5. The output signals of attenuators 4 and 5 (indicated at (a) and (b) in FIG. 1) are added by adder 7. Thus, adder 7 produces an output signal representative of the average of the preceding-by-1H video signal and the present video signal (indicated at (c) in FIG. 1) and which provides a signal of the second field for the frame signal. Here, the function of delay line 2 is to finely adjust the delay time error of 1H delay line 3 so that the difference in time between the signals (a) and (b) becomes exactly equal to 1H (63.556 μsec.)

The thus-averaged signal becomes a so-called scanning line interpolation video signal. This signal and the aforesaid ½H signal are sent to selector switch 6 and are allowed to selectively appear at an outlet 12.

A vertical synchronization separator circuit 13, which is receptive of the video signals from inlet 11, produces vertical synchronizing signals which are then applied to a switching signal forming circuit 14. In synchronism with the vertical synchronizing signals, this circuit 14 produces switching signals controlling the operation of the selector switch 6 in such a manner that the ½H signal and the scanning line interpolation video signal at the output alternate in every vertical scanning period. Therefore, the output of selector switch 6 becomes a frame signal.

By such scanning line interpolation, the degree of vertical resolution of the field signal is increased from 262.5 lines (for note, in NTSC signal) to apparently 2 times as large, or 525 lines, improving the quality of the reproduced image.

In the apparatus of the character described above, however, it also results, even in the period including the vertical synchronizing signal, that the above-described treatment for obtaining the average signal by the line interpolation takes place. Therefore, an intermediate level is created for the vertical synchronizing component of the scanning line interpolation signal. FIG. 2 is a timing chart of wave forms appearing at various points (a) to (c) of FIG. 1, illustrating various fly-back time relationships to each other. In separating the vertical synchronizing signal out of the frame signal obtained by the apparatus of FIG. 1, therefore, the length of the vertical synchronizing signal as separated on the basis of the threshold level of the separator circuit is caused to alter from the proper 3H to 2H or 4H or the like. It also happens that the start point of the vertical synchronizing signal differs by 1H for the same reason. Upon consideration of the use of the separated vertical synchronizing signal for various desired purposes, therefore, problems have arisen.

SUMMARY OF THE INVENTION;

It is an object of the present invention to eliminate all the above-described drawbacks of the prior art technique.

Another object is to provide a video signal processing device in which video signals are treated by utilizing the vertical correlativity without involving any bad influence on the vertical synchronizing signal.

To this end, in accordance with the invention, a video signal processing device which comprises delay means for delaying video signals by a prescribed period related to the horizontal scanning to produce delayed video output signals, selection means for selectively passing the video signal and the delayed video signal therethrough, and computing means for computing the video signal which did not undergo treatment by said delay means and the video signal which was produced from said selection means, is provided as one embodiment thereof.

These and other objects and features of the invention will become apparent from the following detailed description of embodiments thereof taken in conjunction with the accompanying drawings.

BRIEF DESCRIPTION OF THE DRAWINGS

FIG. 3 is a block diagram of the main parts of an embodiment of a video signal processing device according to the present invention.

FIG. 4 is a timing chart of waveforms appearing at various points of FIG. 3.

DETAILED DESCRIPTION OF THE PREFERRED EMBODIMENTS

Figure 1:
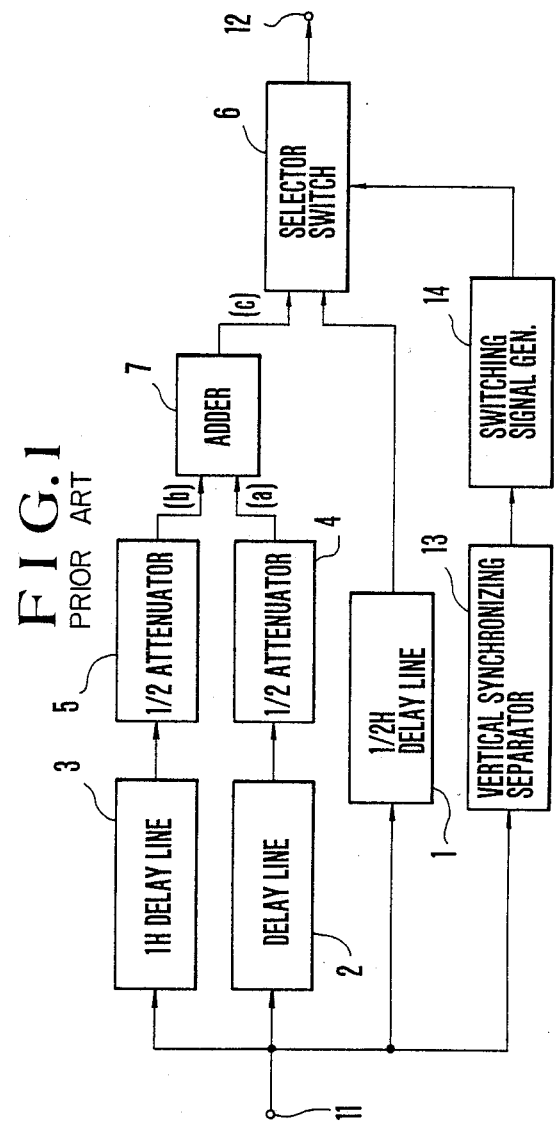
FIG. 1 is a block diagram illustrating an example of the main parts of the conventional video signal processing device.
Figure 2:
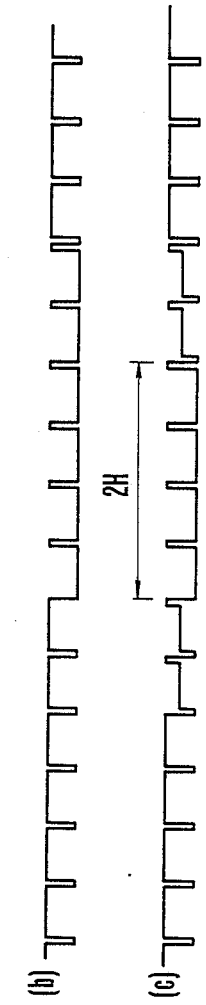
FIG. 2 is a timing chart of waveforms appearing at various points of FIG. 1.

In FIG. 3 there is shown a video signal reproducing apparatus employing one form of the invention where the same reference characters have been employed to denote the similar parts to those shown in FIG. 1. The reproduced video signals are processed first in two ways, one of which passes through 1H delay line 3 followed by ½-amplitude attenuator 5, and the other of which passes through delay line 2 for fine adjustment followed by ½-amplitude attenuator 4, to a selector switch 15 operating with switching control signals produced from a switching signal forming circuit 17 in the form of pulses of 4H duration as shown on line (d) in FIG. 4. Responsive to this switching control signal, for the aforesaid 4H period, selector switch 15 passes the output signal of delay line 2 (shown on line (a) in FIG. 4) to adder 7 therethrough. It is, therefore, during this 4H period that adder 7 produces an output of 2 times higher amplitude than that of the signal shown in FIG. 4(a) and therefore that, since the amplitude having effect of attenuator 4 is cancelled out, the output signal of adder 7 is substantially equal to the output signal of delay line 2 for fine adjustment. It is to be noted that since the delay time of delay line 2 is significantly shorter than that of 1H delay line 3 which is one of the essential parts of the invention, the delay line 2, hence, is essentially irrelevant to the invention.

In the other period than the aforesaid 4H, selector switch 15 allows the output signal of 1H delay line 3 (shown on line (b) of FIG. 4) to pass the adder 7 therethrough. By adder 7, therefore, the output signal of 1H delay line 3, after having been treated through ½-amplitude attenuator 5 and the output signal of delay line 2 for fine adjustment after having been treated through ½-amplitude attenuator 4, or the signals (a) and (b) of FIG. 4, are combined to produce a signal representative of the average of the preceding-by-1H video signal and the present video signal.

A circuit 16 in FIG. 3 for separating composite synchronizing signals from the video signals arriving at inlet 11 is shown. The composite synchronizing output signal of said circuit 16 is supplied to the switching signal forming circuit 17. At the output of this circuit 17 there is produced in synchronism with this composite synchronizing signal a switching control signal for controlling the operation of selector switch 15 as has been described above. 18 is a circuit for further separating a vertical synchronizing signal from that composite synchronizing signal. The circuits 16 and 18 in combination have an equivalent function to that of the vertical synchronizing signal separator circuit 13 of FIG. 1.

In the apparatus of such construction, for the aforesaid 4H period, the video signals from inlet 11 are transferred to outlet 12 without alternation so that no bad influence is given to the vertical synchronizing signal. Also for the other period than the 4H, that video signal which arrived at inlet 11 before 1H, and that video signal which now arrives are combined to produce an output in the form of an average signal. And, these signals constitute a video signal for the second field of the frame, and also a scanning line interpolated video signal. It is to be noted that for the first field of the frame, similarly to the prior art of FIG. 1, the signal from the ½H delay line is used.

Though the foregoing embodiment has been described in connection with the switching period as defined to be 4H, another value of period which is more or less longer may be adopted, provided that the 4H is included. In this case, the time for scanning line interpolation is only shortened by that difference, to say nothing of being particularly free from a serious problem.

Figure 5:
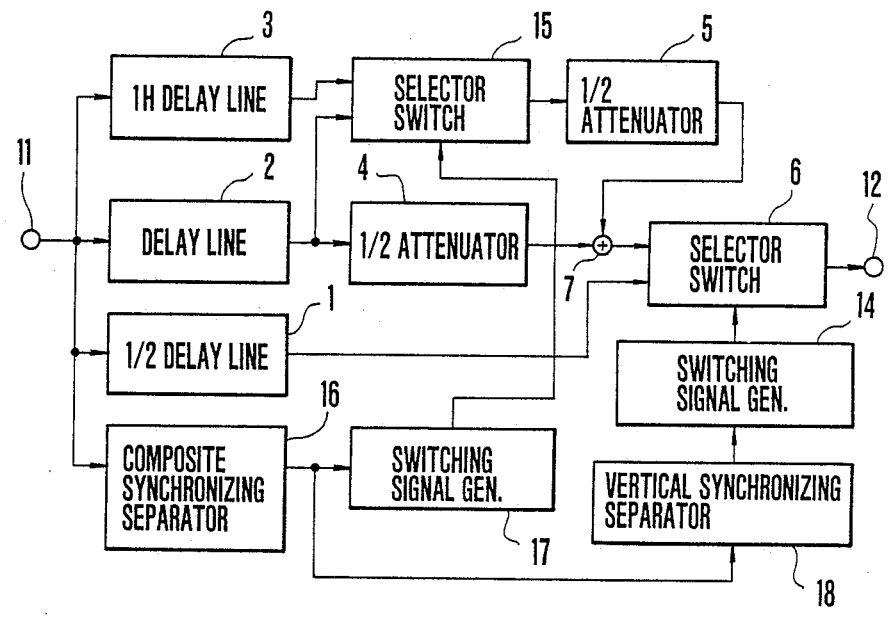
FIG. 5 is similar to FIG. 3 except that another embodiment of the invention is illustrated.

FIG. 5 illustrates another embodiment of the invention different from FIG. 3 embodiment in that the ½ attenuators are changed in position relative to the selector switch. Because of the difference being limited as such, it will be self-evident that the apparatus of FIG. 5 has similar advantages to those of the apparatus of FIG. 3. For note, all the parts are similar to those shown in FIG. 3 and are given the same reference numerals to omit their explanation.

Figure 6:
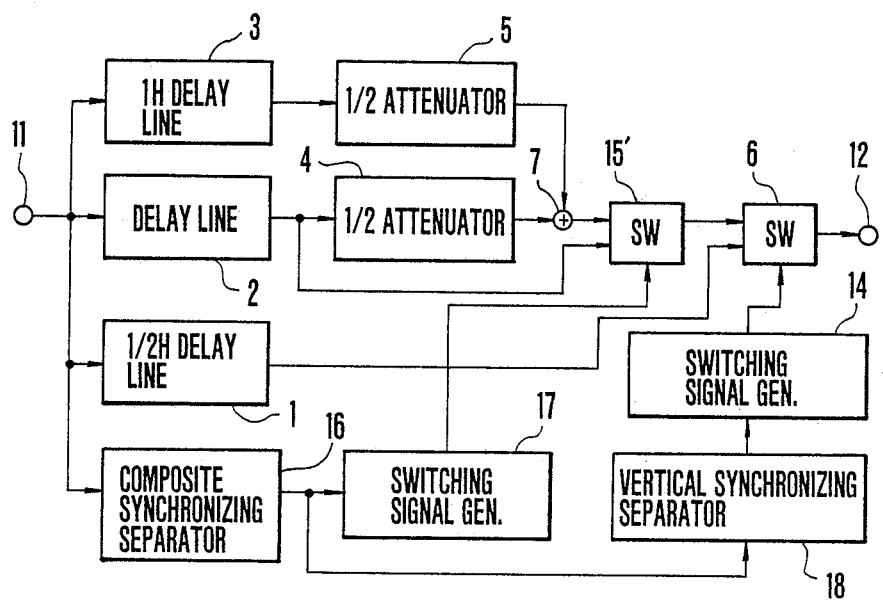
FIG. 6 is similar to FIG. 5 except that still another embodiment of the invention is illustrated.

FIG. 6 illustrates still another embodiment of the invention where the same reference characters have been employed to denote the similar parts to those shown in FIG. 3. 15' is a selector switch of which the operation is controlled by a similar switching control signal to that for the switch 15 of FIG. 3.

That is, by the apparatus of FIG. 6, for a prescribed period including the vertical synchronizing signal, the output signal of delay line 2 for fine adjustment is transferred without alternation to the output signal of switch 15'. For the other period, the output signal of adder 7 becomes the output signal of switch 15'. Therefore, substantially the same result as with the apparatus of FIGS. 3 and 5 is effected.

As has been described in greater detail above, according to the video signal processing device of the invention, where a signal responsive to both of adjacent two horizontal scanning lines is obtained, it is at least in the period including the vertical synchronizing signal that without having substantially to be altered, the aforesaid video signals are transferred to the outlet, with an advantage that any bad influence is not given to the vertical synchronizing signal. Another advantage is that the thus-obtained video signal provides a vertical synchronizing signal which can be used in many purposes, for example, controlling the relative speed between the recording or reproducing head and the recording medium, or automatically changing over between the two heads.

What I claim:

1. A video signal processing device, comprising:
   (a) delay means for delaying an input video signal to produce a first video signal and a second video signal, said first video signal and said second video signal being different in time from each other by a time equal to an integer number times one horizontal scanning period of the input video signal;
   (b) switching means for outputting either the first video signal or the second video signal;
   (c) mixing means for mixing the first video signal and an output signal of said switching means; and
   (d) control means for controlling said switching means so that said switching means outputs the first video signal during the vertical synchronizing period of the input video signal.

2. A device according to claim 1, wherein said control means includes separation means for separating a composite synchronizing signal from the input video signal, and generation means for generating a control signal to control said switching means based on the composite synchronizing signal separated by said separation means.

3. A device according to claim 1, further comprising first attenuating means for attenuating the first video signal and second attenuating means for attenuating the second video signal.

4. A device according to claim 3, wherein said switching means is arranged to output either the first video signal attenuated by said first attenuating means or the second video signal attenuated by said second attenuating means.

5. A device according to claim 4, wherein said mixing means includes an adding circuit for adding the first video signal attenuated by said first attenuating means and the output signal of said switching means.

6. A device according to claim 1, wherein said mixing means includes first attenuating means for attenuating the output signal of said switching means, second attenuating means for attenuating the first video signal, and adding means for adding the signal attenuated by said first attenuating means and the first video signal attenuated by said second attenuating means.

7. A video signal processing circuit, comprising:
(a) delay means for delaying an input video signal to produce a first video signal and a second video signal, said first video signal and said second video signal being different in time from each other by a time equal to an integer number times one horizontal scanning period of the input video signal;
(b) mixing means for mixing the first video signal and the second video signal to produce a mixed video signal;
(c) switching means for outputting either the first video signal or the mixed video signal; and
(d) control means for controlling said switching means so that said switching means outputs the first video signal during the vertical synchronizing period of the input video signal.

8. A device according to claim 7, wherein said control means includes separation means for separating a composite synchronizing signal from the input video signal, and generation means for generating a control signal to control said switching means based on the composite synchronizing signal separated by said separation means.

9. A device according to claim 7, wherein said mixing means includes first attenuating means for attenuating the first video signal, second attenuating means for attenuating the second video signal, and adding means for adding the first video signal attenuated by said first attenuating means and the second video signal attenuated by said second attenutating means.

10. A video signal processing device, comprising:
(a) delay means for delaying an input video signal to produce a first video signal and a second video signal, said first video signal and said second video signal being different in time from each other by a time equal to an integer number times one horizontal scanning period of the input video signal;
(b) process means, arranged to input said first video signal and said second video signal, for outputting either the first video signal or a mixed signal which includes the first video signal and the second video signal; and
(c) control means for controlling said process means so that said process means outputs the first signal during the vertical synchronizing period of the input video signal.

* * * * *